US011070718B2

(12) United States Patent
Barton et al.

(10) Patent No.: US 11,070,718 B2
(45) Date of Patent: Jul. 20, 2021

(54) IMAGE STABILIZATION SYSTEMS AND METHODS

(71) Applicant: FLIR Surveillance, Inc., Wilsonville, OR (US)

(72) Inventors: Mitch G. Barton, Tigard, OR (US); Charles Rush, Wilsonville, OR (US); Sheldon Johnson, Wilsonville, OR (US)

(73) Assignee: FLIR SURVEILLANCE, INC., Wilsonville, OR (US)

( * ) Notice: Subject to any disclaimer, the term of this patent is extended or adjusted under 35 U.S.C. 154(b) by 0 days.

(21) Appl. No.: 16/441,697

(22) Filed: Jun. 14, 2019

(65) Prior Publication Data

US 2019/0387161 A1 Dec. 19, 2019

Related U.S. Application Data

(60) Provisional application No. 62/686,584, filed on Jun. 18, 2018.

(51) Int. Cl.
*H04N 5/232* (2006.01)
(52) U.S. Cl.
CPC ....... *H04N 5/23222* (2013.01); *H04N 5/2328* (2013.01); *H04N 5/23258* (2013.01)
(58) Field of Classification Search
CPC ........... H04N 5/23222; H04N 5/23258; H04N 5/332; H04N 17/002; H04N 5/2328;
(Continued)

(56) References Cited

U.S. PATENT DOCUMENTS 8,203,702 B1 6/2012 Kane et al.
2005/0069325 A1 3/2005 Cicchiello et al.
(Continued)

OTHER PUBLICATIONS

General Dynamics Mission Systems, Inc."Fast Steering Mirrors", 3 pages [online], [retrieved on Aug. 15, 2019], Retrieved from the Internet: <URL: https://gdmissionsystems.com/imaging/optical-systems/fast-steering-mirrors/fast-steering-mirror>.
(Continued)

*Primary Examiner* — Ahmed A Berhan
(74) *Attorney, Agent, or Firm* — Haynes and Boone, LLP

(57) ABSTRACT

Open-loop or feed-forward image stabilization systems and related techniques are provided to improve the accuracy and reliability of imaging systems. An open-loop or feed-forward image stabilization system includes a fast steering mirror assembly, an angular motion sensor, and a logic device. The fast steering mirror assembly adjusts a propagation direction of an optical path for an imaging system. The angular motion sensor is configured to measure and provide an angular motion of the imaging system. The logic device is configured to provide open-loop or feed-forward control for the fast steering mirror assembly by determining a compensating angular offset for the fast steering mirror assembly based, at least in part, on the received angular motion of the imaging system, and by controlling the fast steering mirror assembly to adjust the propagation direction of the optical path for the imaging system according to the determined compensating angular offset.

20 Claims, 11 Drawing Sheets

(58) Field of Classification Search
CPC ........... H04N 5/232121; H04N 5/2351; H04N 5/2353; G02B 27/64
See application file for complete search history.

(56) References Cited

U.S. PATENT DOCUMENTS

| | | | |
|---|---|---|---|
| 2008/0136923 A1* | 6/2008 | Inbar | H04N 5/23287 348/208.2 |
| 2008/0246917 A1* | 10/2008 | Phinney | G06K 9/00255 351/208 |
| 2010/0220390 A1 | 9/2010 | Wein et al. | |
| 2013/0242123 A1* | 9/2013 | Norman | H04N 5/2328 348/208.14 |
| 2017/0244880 A1* | 8/2017 | Cope | G01C 11/02 |

OTHER PUBLICATIONS

Pi "High Dynamics & Stability Nanopositioning System with Direct Metrology", 3 pages ]online], [retrieved on Aug. 15, 2019], Retrieved from the Internet: <URL: http://www.pi-usa.us/products/PDF_Data/S323_Piezo_Tip_Tilt_Platform_Mirror.pdf>.
Tapos et al., "High Bandwidtch Fast Steering Mirror", Proceedings of SPIE, Optomechanics 2005, 14 pages, vol. 5877, Bellingham, WA.

* cited by examiner

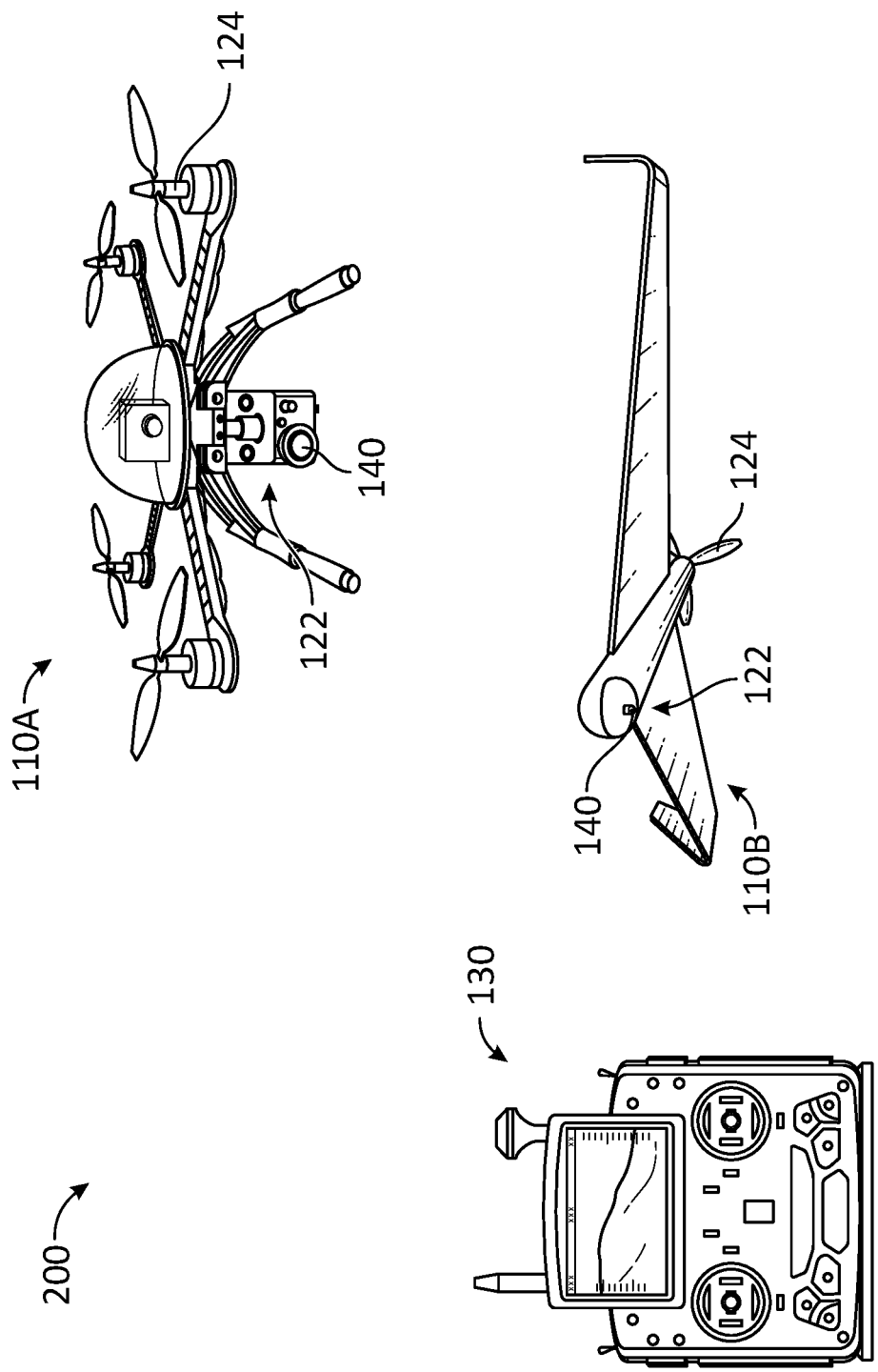

IMAGE STABILIZATION SYSTEMS AND METHODS

CROSS REFERENCE TO RELATED APPLICATIONS

This application claims the benefit of and priority to U.S. Provisional Patent Application No. 62/686,584 filed Jun. 18, 2018 and entitled "IMAGE STABILIZATION SYSTEMS AND METHODS," which is incorporated herein by reference in its entirety.

TECHNICAL FIELD

The present invention relates generally to image stabilization and, more particularly, to open-loop or feed-forward image stabilization systems and methods incorporating fast steering mirrors.

BACKGROUND

Articulated sensors have long been used to monitor relatively broad sensor areas when it is not feasible or convenient to monitor such areas using an array of fixed sensors. For example, articulated sensors can be reoriented or swept through various orientations relative to a monitored area to gather a broad range of sensor data efficiently. Moreover, similar mounting mechanisms and techniques, such as actuated gimbal systems, are often used to couple sensors to mobile platforms so as to allow such sensors to be reoriented to compensate for motion of the mobile platform, for example, or to focus on a particular target or area that may be moving relative to the mobile platform.

In particular, when a conventional articulated or mobile imaging system is aimed or focused on a target or area, motion of the platform to which the imaging system is mounted, including vibrations, can cause orientation errors in the aiming of the imaging system, and such orientation errors can result in relatively poor imaging performance, particularly for applications including long range or narrow aperture imaging (e.g., 1000 s of feet or more between the imager and the area being imaged, or magnified imaging), where the orientation errors can result in various forms of image jitter, blur, and misalignment, particularly as a mobile platform is in motion.

Conventional image stabilization techniques rely on closed-loop control of various optical elements in the optical path, and such closed-loop control requires relatively complex control systems and integrated optical element position/orientation sensors that are often difficult and expensive (both in terms of cost and compute resources) to implement, particularly as the necessary compensation speed of the system increases (e.g., related to the change in error value over time of the expected orientation errors—similar to slew rate in electronics—and/or the frame rate of the imager, for example). Thus, there is a need in the art for methodologies to reliably reduce the complexity of image stabilization systems to combat such orientation errors reliably.

SUMMARY

Open-loop or feed-forward image stabilization systems and related techniques are provided to improve the accuracy and reliability of imaging systems. One or more embodiments of the described image stabilization systems may advantageously include a fast steering mirror assembly to adjust a propagation direction of an optical path for an imaging system, a controller to control the fast steering mirror assembly, and one or more sensors to measure and provide an angular motion of the imaging system (e.g., not the fast steering mirror assembly or its mirror). For example, such sensors may include an orientation sensor, a gyroscope, and/or an accelerometer providing the angular motion of the imaging system or payload. The sensor system may include one or more visible spectrum and/or infrared cameras, for example, and/or other types of generally directional sensor systems. The platform may generally be a flight platform (e.g., a manned aircraft, a UAS, and/or other flight platform), a terrestrial platform (e.g., a fixed structure or a motor vehicle), or a sea born platform (e.g., watercraft).

In one embodiment, a system includes a fast steering mirror assembly coupled within an imaging system and configured to adjust a propagation direction of an optical path for the imaging system, an angular motion sensor coupled to the imaging system and configured to provide an angular motion of the imaging system, and a logic device configured to communicate with the gyroscope or accelerometer and provide open-loop or feed-forward (e.g., non-closed-loop) control for the fast steering mirror assembly based on the angular motion of the imaging system. The logic device may be configured to receive the angular motion of the imaging system, determine a compensating angular offset for the fast steering mirror assembly based, at least in part, on the received angular motion of the imaging system, and control the fast steering mirror assembly to adjust the propagation direction of the optical path for the imaging system according to the determined compensating angular offset. The compensating angular offset may be configured to stabilize an image projected along the optical path to an imaging module of the imaging system, relative to the angular motion of the imaging system.

In another embodiment, a method includes receiving an angular motion of an imaging system from an angular motion sensor coupled to the imaging system, determining an angular offset for a fast steering mirror assembly coupled within the imaging system based, at least in part, on the received angular motion of the imaging system, and controlling the fast steering mirror assembly, according to open-loop or feed-forward control based on the angular motion of the imaging system, to adjust a propagation direction of an optical path for the imaging system according to the determined compensating angular offset. The fast steering mirror assembly may be configured to adjust the propagation direction of the optical path for the imaging system, and the compensating angular offset may be configured to stabilize an image projected along the optical path to an imaging module of the imaging system, relative to the angular motion of the imaging system.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2A illustrates a diagram of mobile platforms of an articulated sensor/payload system including articulated imaging systems and associated gimbal systems and open-loop or feed-forward image stabilization systems in accordance with an embodiment of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
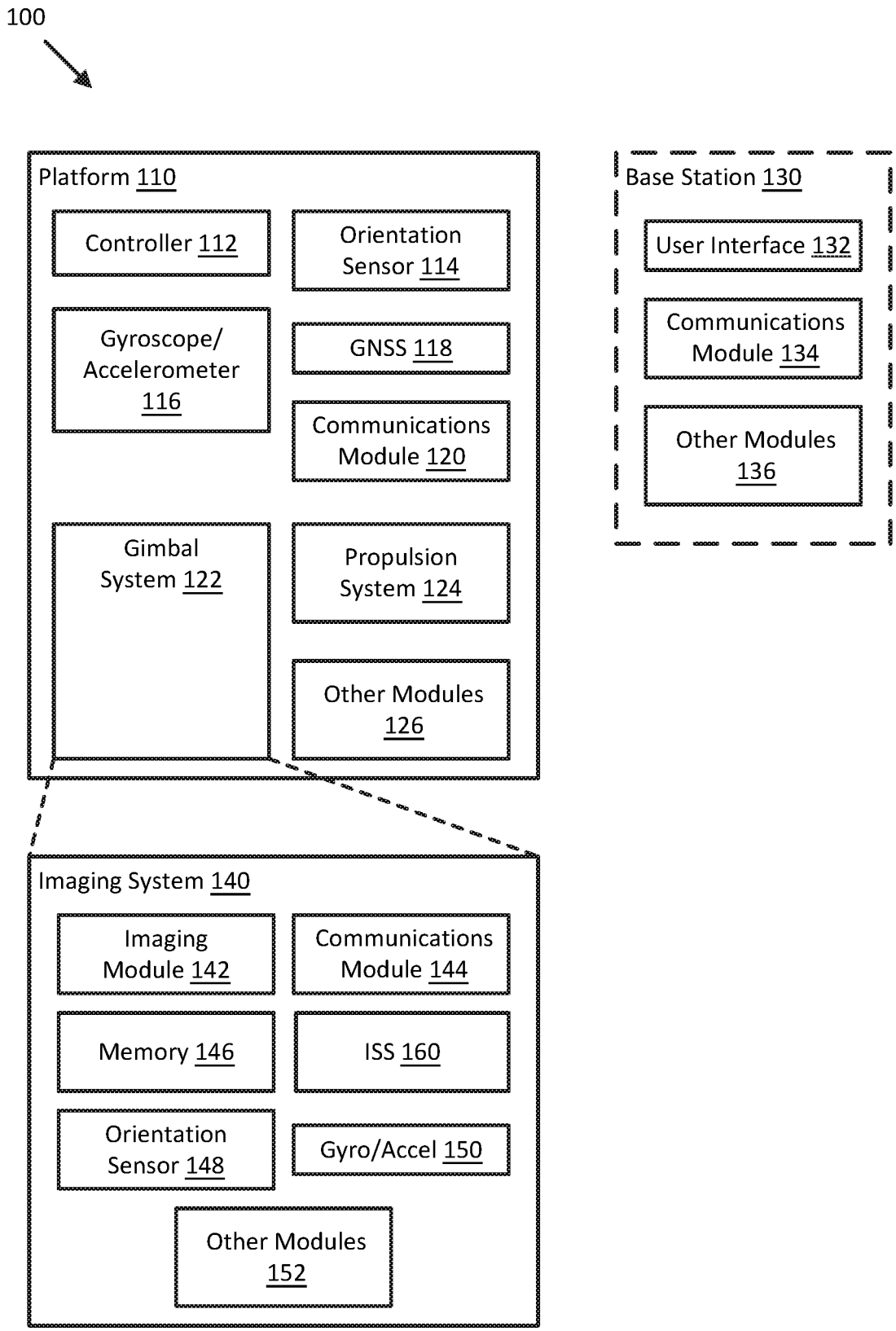
FIG. 1 illustrates a diagram of an articulated sensor/payload system including an imaging system and an open-loop or feed-forward image stabilization system in accordance with an embodiment of the disclosure.

Open-loop or feed-forward image stabilization systems and related techniques are provided to improve the accuracy and reliability of imaging systems generally and, particularly, articulated imaging systems (e.g., imaging systems that are actuated and controllable to adjust an orientation of the imaging system). An open-loop or feed-forward image stabilization system may advantageously include a fast steering mirror assembly to adjust a propagation direction of an optical path for an imaging system, a controller to control the fast steering mirror assembly, and one or more sensors to measure and provide an angular motion of the imaging system. Such sensors may include an orientation sensor, a gyroscope, and/or an accelerometer providing the angular motion of the imaging system or payload, which may be relative to an optical path for the imaging system, for example, or a line of sight for the imaging system, as described herein. The imaging system or payload may include one or more visible spectrum and/or infrared cameras, for example, a laser targeting system, and/or other types of generally directional sensor systems. The platform may be a flight platform (e.g., a manned aircraft, a UAS, and/or other flight platform), a terrestrial platform (e.g., a motor vehicle, or a fixed structure), or a sea born platform (e.g., watercraft, buoys, and sea platforms).

Various embodiments provide an open-loop or feed-forward image stabilization system to stabilize imaging systems generally, and more particularly, airborne gimbaled or articulated imaging systems, which are often prone to vibrations and other motions causing relatively small (e.g., +−100 urad) angular misalignments with a desired targeting direction. Embodiments incorporate an angular fast steering mirror assembly (FSMA) that is actuated by piezoelectric actuators with almost hysteresis-free operational characteristics, relative to traditional piezoelectric actuators, which allows for open-loop or feed-forward control of the FSMA. Embodiments employ relatively fast custom drive electronics and corresponding control techniques. In various embodiments, the FSMA is disposed within the imaging system along a common optical path (e.g., for multiple imagers/devices) and provides 5th/6th axis (e.g., tip/tilt, or pitch/yaw) stabilization to associated devices (e.g., IR imagers, electro-optical imagers, laser targeting systems, and/or other directional sensors, devices, and/or payloads), as described herein. Open-loop or feed forward control is facilitated through use of thermal characterization and calibration performed prior to active deployment. Accordingly, embodiments achieve relatively high accuracy of FSMA image stabilization over a range of temperatures in open-loop or feed-forward control without relatively costly and complex closed-loop sensor feedback techniques. Certain additional embodiments incorporate precision circuitry and/or fault detection features to help ensure reliable operation in tactical (e.g., military) environments (e.g., reliable operation within or exceeding the range of environmental conditions set forth in MIL-STD-810G).

Conventional image stabilization systems typically employ actuators that cannot reliably reproduce a desired actuation amount relative to an applied input drive signal, and so such actuators cannot be used with open-loop or feed-forward control techniques. Closed-loop control has been attempted in an effort to combat such hysteresis or drift effects, but the actuator position/actuation sensors required by such closed-loop control are often themselves unreliable and/or sufficiently inaccurate over the desired range of temperatures to render the resulting image stabilization ineffective at the desired ranges to target and frame rates (e.g., putting a lower bound on how coarse and slow the image stabilization system can operate while maintaining substantially blur-free imaging). Omitting such sensors and closed-loop control techniques provides a substantial reduction in system cost and complexity, and embodiments of the present disclosure provide, at the same time, increased reliability and accuracy over conventional systems.

FIG. 1 illustrates a block diagram of articulated sensor/payload system 100 in accordance with an embodiment of the disclosure. In some embodiments, system 100 may be configured to fly over or approach a target and image or sense the target using gimbal system 122 to aim imaging system 140 at the target. Resulting imagery and/or other sensor data may be processed (e.g., by imaging system 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of platform 110 and/or imaging system 140, as described herein, such as controlling gimbal system 122 to aim imaging system 140 towards a particular direction, or controlling propulsion system 124 to move platform 110 to a desired position relative to a target (e.g., where platform 110 is mobile).

In the embodiment shown in FIG. 1, articulated sensor system 100 includes platform 110, optional base station 130, and at least one imaging system/payload 140. Platform 110 may be a fixed platform, for example, or may be a mobile platform configured to move or fly and position and/or aim imaging system 140 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Operation of platform 110 may be substantially autonomous and/or partially or completely controlled by optional base station 130, which may include one or more of a user interface 132, a communications module 134, and other modules 136. In other embodiments, platform 110 may include one or more of the elements of base station 130, such as with various types of manned aircraft, terrestrial vehicles, and/or watercraft. Imaging system 140 may be physically coupled to platform 110 and be configured to capture sensor data (e.g., visible spectrum images, infrared images, narrow aperture radar data, and/or other sensor data) of a target position, area, and/or object(s) as selected and/or framed by operation of platform 110 and/or base station 130. In some embodiments, one or more of the elements of system 100 may be implemented in a combined housing or structure that can be coupled to or within platform 110 and/or held or carried by a user of system 100. In some embodiments, platform 110 may correspond to a handheld device.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or imaging system 140.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), gimbal system 122, imaging system/payload 140, and/or other elements of system 100, and providing such measurements as sensor signals that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals from base station 130 and provide them to controller 112 and/or propulsion system 124. In other embodiments, communications module 120 may be configured to receive images and/or other sensor information (e.g., visible spectrum and/or infrared still images or video images) from imaging system 140 and relay the sensor data to controller 112 and/or base station 130. In some embodiments, communications module 120 may be configured to support spread spectrum transmissions, for example, and/or multiple simultaneous communications channels between elements of system 100.

In some embodiments, gimbal system 122 may be implemented as an actuated gimbal mount, for example, that may be controlled by controller 112 to stabilize imaging system 140 relative to a target or to aim imaging system 140 according to a desired direction and/or relative position. As such, gimbal system 122 may be configured to provide a relative orientation of imaging system 140 (e.g., relative to an orientation of platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/payload 140. In further embodiments, gimbal system 122 may be configured to couple to a laser pointer, range finder, and/or other device, for example, to support, stabilize, power, and/or aim multiple devices (e.g., imaging system 140 and one or more other devices) substantially simultaneously.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of platform 110, for example. In some embodiments, other modules 126 may include a humidity sensor, a wind and/or water temperature sensor, a barometer, an altimeter, a radar system, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100. In some embodiments, other modules 126 may include one or more actuated and/or articulated devices (e.g., multi-spectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112).

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause platform 110 to move according to the target heading, route, and/or orientation, or to aim imaging system 140 accordingly. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated or articulated device (e.g., imaging system 140) associated with platform 110, for example, and to generate control signals for adjusting an orientation and/or position of the actuated device according to the target attitude, orientation, and/or position. Such control signals may be transmitted to controller 112 (e.g., using communications modules 134 and 120), which may then control platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from imaging system 140. In some embodiments, communications module 134 may be configured to support spread spectrum transmissions, for example, and/or multiple simultaneous communications channels between elements of system 100.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/payload 140 is implemented as an imaging device, imaging system 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, imaging system 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of imaging system 140 may be implemented as any wired and/or wireless communications module configured to transmit and receive analog and/or digital signals between elements of system 100. For example, communications module 144 may be configured to transmit infrared images from imaging module 142 to communications module 120 or 134. In other embodiments, communications module 144 may be configured to receive control signals (e.g., control signals directing capture, focus, selective filtering, and/or other operation of imaging system 140) from controller 112 and/or user interface 132. In some embodiments, communications module 144 may be configured to support spread spectrum transmissions, for example, and/or multiple simultaneous communications channels between elements of system 100.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of imaging system 140 may be implemented similar to orientation sensor 114 or gyroscope/accelerometer 116, and/or any other device capable of measuring an orientation of imaging system 140, imaging module 142, and/or other elements of imaging system 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of imaging system 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of imaging system 140 and/or various elements of imaging system 140 and providing such measurements as sensor signals that may be communicated to various devices of system 100 (e.g., ISS 160).

In various embodiments, imaging system 140 may include an open-loop or feed-forward image stabilization system (ISS) 160, which may be configured to adjust or manipulate a propagation direction of an optical path of imaging system 140 in order to stabilize an image projected along the optical path to imaging module 142 of imaging system 140, relative to a measured angular motion of imaging system 140, for example. For instance, vibrations and other relatively small angular deviations in the aiming of imaging system 140 related to motion of platform 110, gimbal system 122, and/or other elements of system 100, can cause blurring or jitter in images captured by imaging module 142, which can significantly reduce the performance of imaging system 140, particularly when targeting or focusing on objects at long range or narrow apertures. ISS 160 counteracts these motion based effects by changing the propagation direction of a corresponding optical path of imaging system 140 (e.g., between a targeting direction or line of sight of imaging system 140 and imaging module 142) to compensate for the angular motion of gimbal system 122 and/or imaging system 140. The resulting imagery captured by imaging module 142 is thus stabilized relative to the angular motion of gimbal system 122 and/or imaging system 140.

Typically, relatively large amplitude (e.g., greater than approximately +/−100 urad) and/or slow (e.g., less than approximately 5 Hz) angular motion of imaging system 140 may be at least partially counteracted by gimbal system 122, such as to keep a particular target substantially within the field of view of imaging module 142/imaging system 140 while platform 110 and/or the target is in motion, and ISS 160 may be used to compensate for relatively small amplitude (e.g., equal to or less than approximately +/−100 urad) and/or fast (e.g., equal to or greater than approximately 5 Hz, including within the range from 5 to 100 Hz or 120 Hz, or approaching 1000 Hz and/or the maximum bandwidth of the actuators integrated with ISS 160) angular motion of imaging system 140. For example, a controller (e.g., controller 112 of system 100, or a controller of imaging system 140) may receive a measure of angular motion of imaging system 140 from angular motion sensor 150 and differentiate the angular motion into a target keeping component (e.g., to be counteracted or compensated for by gimbal system 122) and an image stabilization component (e.g., to be compensated for by ISS 160), based on the amplitude and/or frequency/rate of the angular motion, for example. In some embodiments, such motion differentiation may take the form of a high pass filter (e.g., to provide the image stabilization component) applied to angular motion measurements provided by angular motion sensor 150, for example, and such high pass filter may be implemented as a digital and/or analog filter applied to such measurements.

In general, ISS 160 may include a fast steering mirror assembly including an actuated mirror disposed along an optical path of imaging system 140, for example, and a controller (e.g., controller 112) may be configured to control the tip and/or tilt of the mirror surface relative to the optical path to counteract angular motion of imaging system 140 and substantially stabilize an image projected along the optical path to imaging module 142. Counteracting or compensating for angular motion of imaging system 140 substantially eliminates image blur and/jitter that would otherwise be caused by such motion. Advantageously, by implementing ISS 160 according to open-loop or feed-forward control techniques, as described herein, embodiments are able to be implemented relatively simply, which can reduce overall system cost and/or increase overall system speed (e.g., the maximum rad/second rate of angular motion that can be fully compensated for by ISS 160). In various embodiments, ISS 160 may be integrated with angular motion sensor 150 and/or imaging system/payload 140, as shown.

Other modules 152 of imaging system 140 may include other and/or additional sensors, actuators, communications modules/nodes, cooled or uncooled optical filters, and/or user interface devices used to provide additional environmental information associated with imaging system 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

FIG. 2A illustrates a diagram of mobile platforms 110A and 110B of articulated sensor/payload system 200 including imaging systems/payloads 140 and associated gimbal systems 122 and open-loop or feed-forward image stabilization systems (e.g., integrated with imaging systems 140) in accordance with an embodiment of the disclosure. In the embodiment shown in FIG. 2A, articulated sensor/payload system 200 includes base station 130, platform 110A with articulated imaging system/payload 140 and gimbal system 122, and platform 110B with articulated imaging system/payload 140 and gimbal system 122, where base station 130 may be configured to control motion, position, and/or orientation of platform 110A, platform 110B, and/or payloads 140.

Figure 2B:
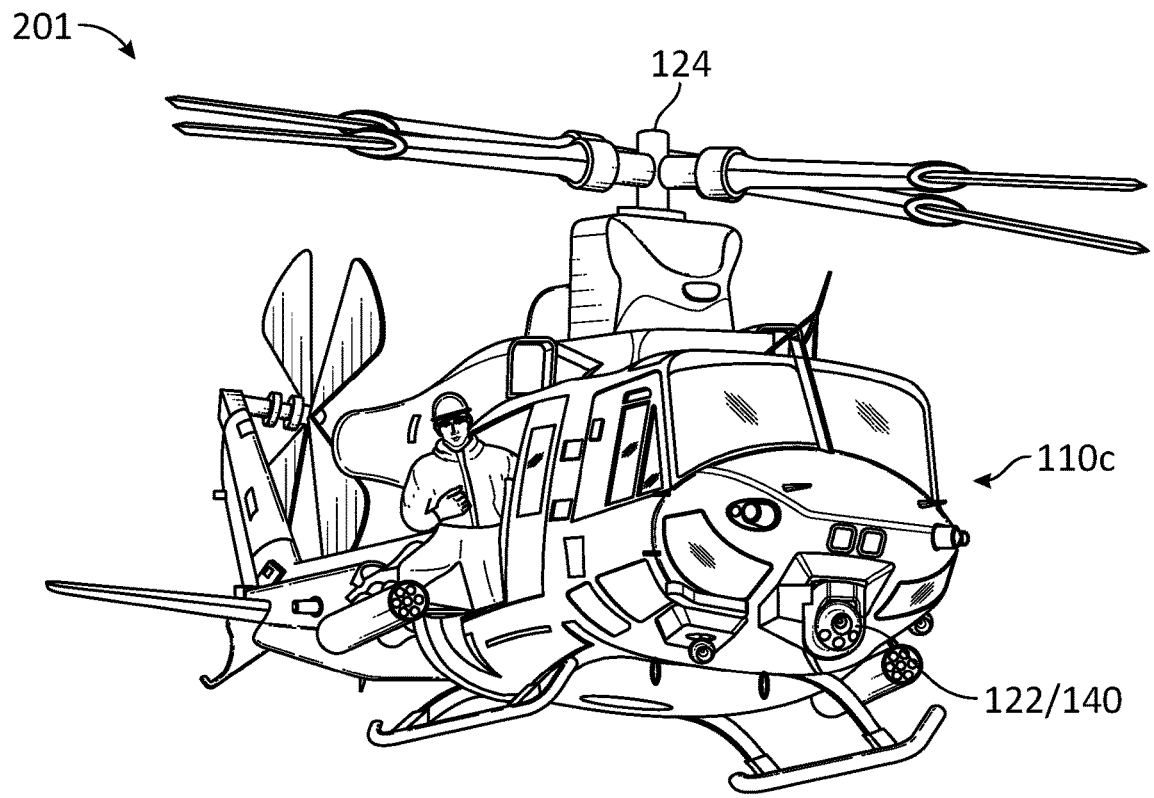
FIGS. 2B-C illustrate diagrams of mobile platforms of an articulated sensor/payload system including articulated imaging systems and associated gimbal systems and open-loop or feed-forward image stabilization systems in accordance with an embodiment of the disclosure.
Figure 2C:
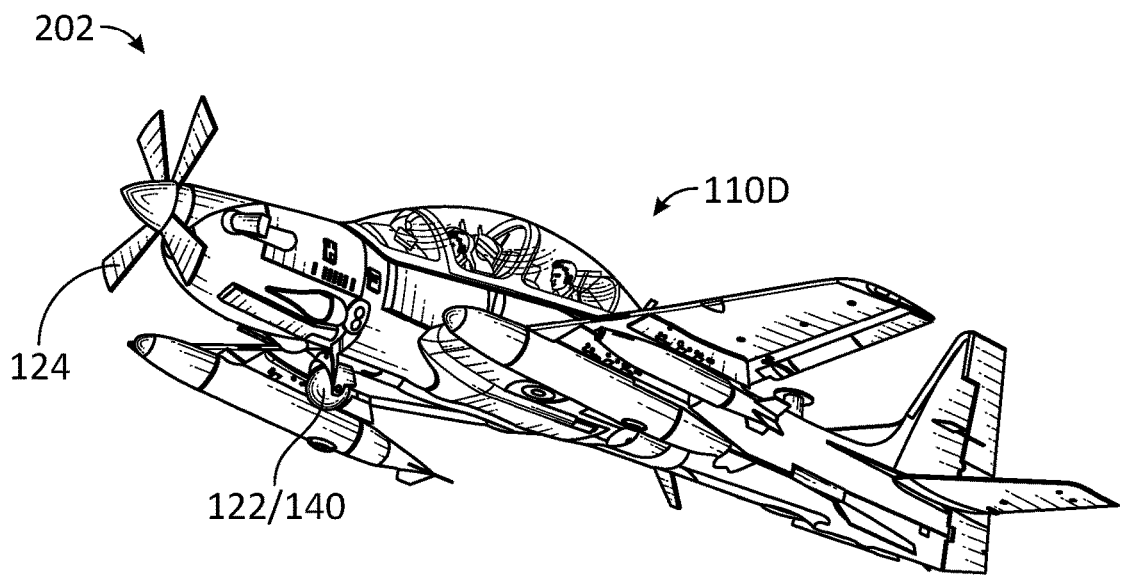

FIGS. 2B-C illustrate diagrams of mobile platforms 110C and 110D of articulated sensor/payload systems 201 and 202 including articulated imaging systems 140 and associated gimbal systems 122 and open-loop or feed-forward image stabilization systems (e.g., integrated with imaging systems 140) in accordance with an embodiment of the disclosure. In the embodiment shown in FIG. 2B, articulated sensor/payload system 201 includes platform/helicopter 110C with articulated imaging system/payload 140 and gimbal system 122. In the embodiment shown in FIG. 2C, articulated sensor/payload system 202 includes platform 110D with articulated imaging system/payload 140 and gimbal system 122.

Figure 3A:
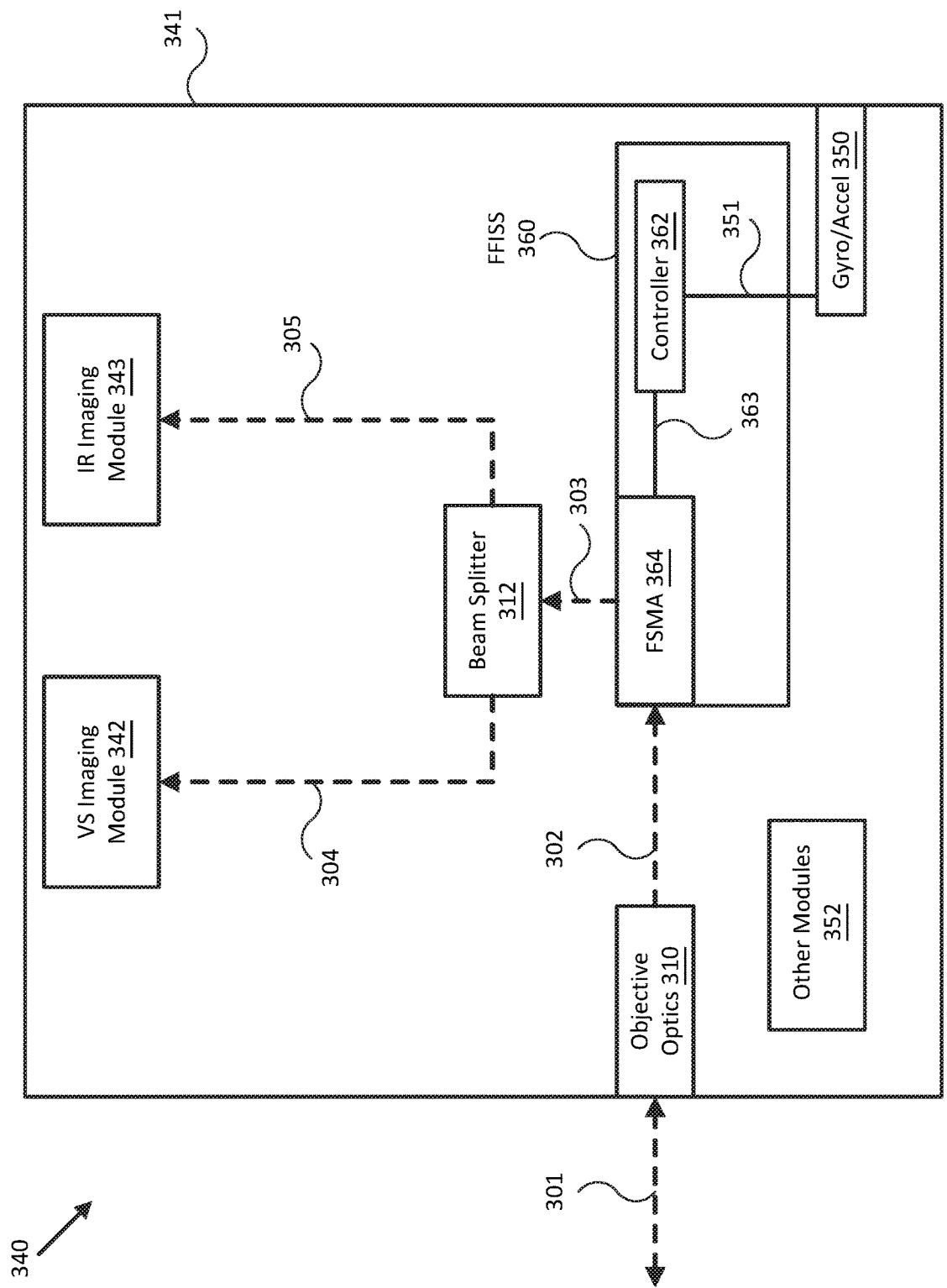
FIG. 3A illustrates a diagram of an articulated imaging system including an open-loop or feed-forward image stabilization system in accordance with an embodiment of the disclosure.

FIG. 3A illustrates a diagram of an imaging system 340 including an open-loop or feed-forward image stabilization system 360 in accordance with an embodiment of the disclosure. As shown in FIG. 3A, imaging system 340 includes ISS 360 providing adjustable optical path 303 to direct imagery (e.g., in the form of electromagnetic radiation emitted or reflected from a scene) projected along line of sight/targeting direction 301 to visible spectrum (VS) imaging module 342 and/or infrared (IR) imaging module 343, all within and/or integrated with housing 341, as shown. More generally, IR imaging module 343 may be configured to be sensitive to a first electromagnetic spectrum, and imaging module 342 may be configured to be sensitive to a second electromagnetic spectrum different from the first electromagnetic spectrum, such as a visible light spectrum, for example, or an infrared spectrum different from that sensed by IR imaging module 343.

Imaging system 340 may also include a variety of other optical elements to facilitate operation of imaging system 340, such as an aperture/objective optics 310 (e.g., to define line of sight 301 and/or to focus and/or collimate imagery received along line of sight 301 and project such optically processed imagery along optical path 302, such as the imagery provided by a telescope assembly, which may form at least a portion of objective optics 310), beam splitter 312 (e.g., to split and/or filter imagery received along adjustable optical path 303 and project such optically processed imagery along optical paths 304 and/or 305), and/or other mirrors or fiber optics or other optical elements to direct, filter, or otherwise optically process imagery delivered to imaging system 340. For example, optical paths 304 and 305 may be implemented by fiber optics and/or mirrors to deliver imagery to VS imaging module 342 and IR imaging module 343, as shown. In various embodiments, imaging system 340 may include various additional elements, such as any of the elements of system 100 shown in and/or described with respect to FIG. 1, including additional gimbals, actuators to rotate gimbals and imaging system 340 about a rotational axis, and various wired power and/or communication links to facilitate operation of imaging system 340. In general, imaging system 340 may be orientated to view a particular direction along line of sight/targeting direction 301.

In typical operations, imaging system 340 may experience angular motion, such as motion and/or vibrations transmitted by platform 110 through gimbal 122, which may be sensed by gyroscope/accelerometer (angular motion sensor) 350. When such motion includes a significant image stabilization component, ISS 360 may be configured to adjust a propagation direction of adjustable optical path 303 to compensate for such angular motion, such as by adjusting a tip and/or tilt of a mirror of fast steering mirror assembly (FSMA) 364, which may be implemented as a fold mirror within the overall optical path for imaging system 340. In embodiments where FSMA is disposed along the primary or common overall optical path for both VS imaging module 342 and/or IR imaging module 343, changes in the propagation direction of adjustable optical path 303 are themselves propagated through to VS imaging module 342 and IR imaging module 343, as shown, which acts to stabilize imagery captured by VS imaging module 342 and IR imaging module 343 simultaneously. Alternatively, each imaging module 342/343 may have its own ISS 360 providing dedicated image stabilization for its respective imaging module.

As shown in FIG. 3A, ISS 360 may include FSMA 364 configured as an adjustable fold mirror to adjust a propagation direction of adjustable optical path 303 and controller 362 configured to receive angular motion measurements from angular motion sensor 350 over communication line 351 and to provide open-loop or feed-forward control of FSMA 364, over communication line 363, based on angular motion measurements provided by angular motion sensor 350. In general, controller 362 may be implemented similarly as described with respect to controller 312 of FIG. 1. More specifically, controller 362 may be configured to determine a compensating angular offset for FSMA 364, where the compensating angular offset is configured to stabilize an image projected along adjustable optical path 303 to imaging modules 342 and/or 343 of imaging system 340, relative to the angular motion of imaging system 340. Controller 362 may then control FSMA 364 to adjust the propagation direction of adjustable optical path 303 according to the determined compensating angular offset. In various embodiments, communication lines 351 and/or 363 may be implemented as analog and/or digital communication lines, including one or more SPI buses, which may provide for one and/or two way digital communications between elements of ISS 360, imaging system 340, and/or system 100.

In some embodiments, the positions of the rotational axes of imaging system 340 may be different from the position of the rotational axes of a mirror of FSMA 364 (e.g., e.g., mirror 366 shown in FIG. 3C, which defines the position of the fold in the overall optical path), and so the line of sight angular deviations caused by angular motion of imaging system 340 may not require equal angular deviations of mirror 366 of FSMA 364. Such angular gains (e.g., defined by the relative positions of the rotational axes and mirror 366) may be determined geometrically and/or through calibration techniques. In the embodiment shown in FIG. 3B, the line of sight angular deviation is approximately 2 times the mirror angle deviation along a first axis of actuator stage 365 and approximately 1.5 times the mirror angle deviation along a second axis of actuator stage 365. Such angular gains may range from approximately 1 to 3 or higher (e.g., or the inverse of those), and controller 362 may be configured to use such angular gains to determine a compensating angular offset for FSMA 364, as described herein.

Gyroscope/accelerometer 350 may be implemented similarly with respect to gyroscope/accelerometer 116 and/or gyroscope/accelerometer 150, for example, and may be configured to measure angular velocities/accelerations (e.g., angular motion) and/or linear accelerations (e.g., direction and magnitude) of imaging system 340 and/or various elements of imaging system 340 and provide such measurements as sensor signals that may be communicated to various devices of imaging system 340 (e.g., controller 362 of ISS 360). Angular motion sensor 350 may be mounted to housing 341 and/or other structure or elements of imaging system 340, for example, and may in some embodiments be disposed near a central axis of rotation of imaging system 340. Angular motion measurements provided by angular motion sensor 350 may be absolute measurements (e.g., relative to gravity and/or Magnetic or True North) or may be relative measurements (e.g., relative to an orientation of imaging system 340).

Imaging system/payload 340 may in various embodiments be implemented as any articulated payload, such as an articulated directional sensor or targeting device, as described herein. In various embodiments, payload 340 may be implemented as a visible spectrum and/or infrared imaging system, for example, configured to image objects along line of sight/targeting direction 301. More generally, line of sight 301 may correspond to a direction indicating an orientation of payload 340, regardless of the type of articulated payload it is. In some embodiments, payload 340 may be a laser targeting system configured to aim a laser beam emitted along line of sight 342 towards a desired target and/or along a desired direction, and such laser beam may be stabilized by embodiments of ISS 360, where, for example, beam splitter 312 is replaced with a laser emitter, and the placements of optical path 302 and adjustable optical path 303 relative to ISS 360 are swapped and their propagation directions reversed.

VS imaging module 342 and IR imaging module 343 may be implemented similarly with respect to imaging module 142 of FIG. 1, for example, and may include a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging modules 442 and/or 343 may include one or more logic devices (e.g., similar to controller 112) that can be configured to process imagery captured by detector elements of imaging modules 342 and 343 before providing the imagery to other elements of imaging system 340 and/or system 100. In some embodiments, imaging modules 342 and/or 343 may alternatively include detector elements configured to detect other spectrums, such as ultraviolet and/or other spectrums or subsets of spectrums. Such imaging modules may be calibrated or registered to each other such that images captured by each imaging module occupy a known and at least partially overlapping field of view of the other imaging module, thereby allowing different spectrum images to be geometrically registered to each other (e.g., by scaling and/or positioning).

Other modules 352 of imaging system 340 may include other and/or additional sensors, actuators, communications modules/nodes, cooled or uncooled optical filters, and/or devices used to facilitate operation of imaging system 340 and/or ISS 360, for example. In some embodiments, other modules 352 may include a humidity sensor, a temperature sensor, a barometer, a radar system, a GNSS, and/or other environmental sensors providing measurements and/or other sensor signals that can be displayed to a user and/or used by elements of imaging system 340 (e.g., imaging modules 342/343 and/or controller 362) to provide operational control of imaging system 340 and/or ISS 360 or to process imagery to compensate for environmental conditions.

Figure 3B:
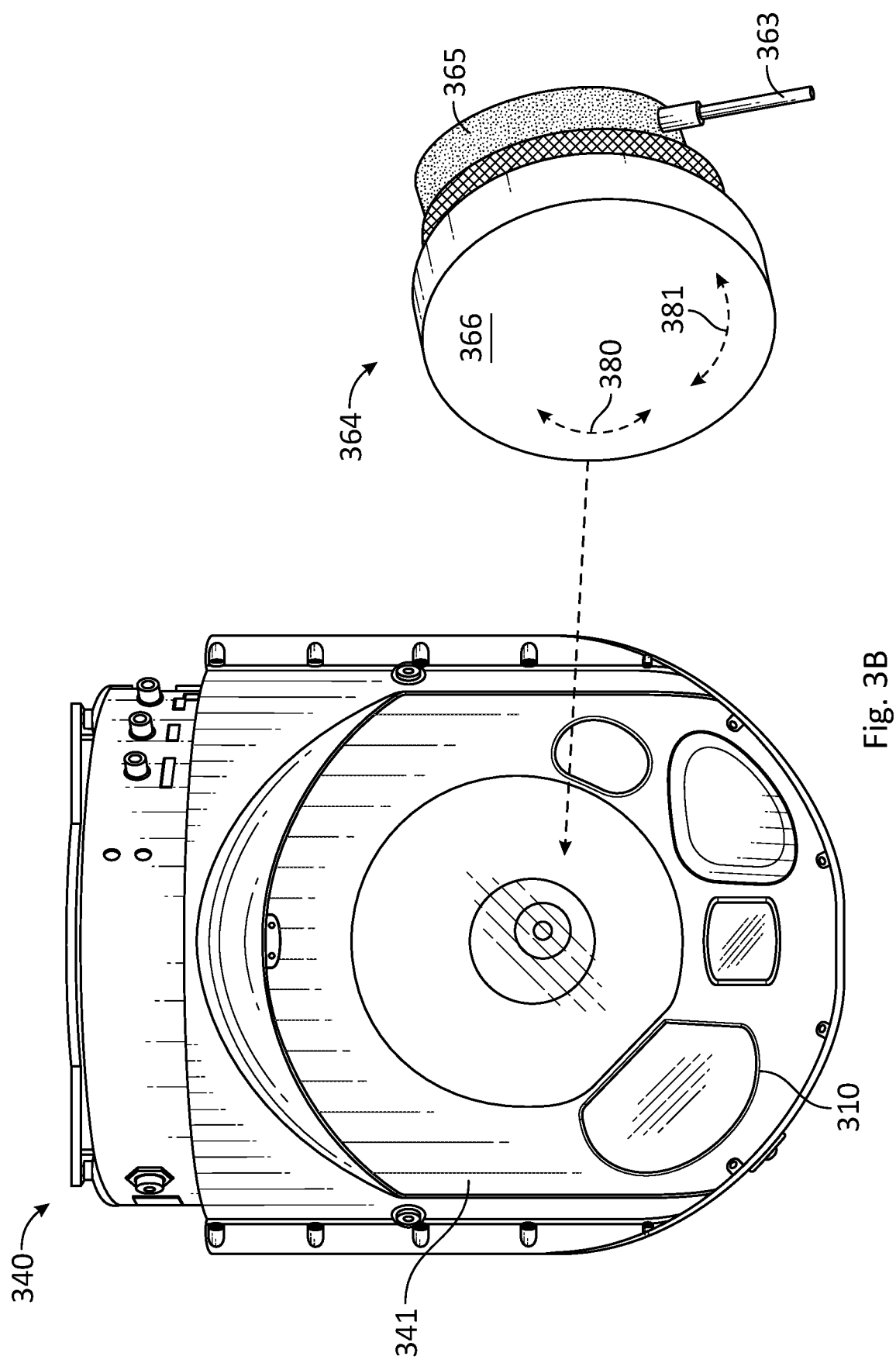
FIG. 3B illustrates a diagram of an articulated imaging system including an open-loop or feed-forward image stabilization system in accordance with an embodiment of the disclosure.

FIG. 3B illustrates a diagram of imaging system 340 including FSMA 364 of ISS 360 in accordance with an embodiment of the disclosure. As shown in FIG. 3B, imaging system 340 includes FSMA 364 implemented as an adjustable fold mirror along an optical path of imaging system 340 behind objective optics 310 within housing 341. FSMA 364 may include an actuator stage 365 configured to provide tip 380 and/or tilt 381 actuation of a coupled mirror/load 366, as controlled by controller 362 over communication line 363. In general, mirror 366 may be configured to reflect a beam of electromagnetic radiation to which an imaging module of imaging system 340 is sensitive. In some embodiments, actuator stage 365 may be implemented as a two-axis actuator stage with two piezoelectric actuators per axis arranged relative to each other and the load interface to reduce temperature related linear and angular mechanical drift and to increase mechanical resonance frequency (which can limit the speed of the actuator stage actuations). Typical specifications for actuator stage 365 include: range of motion—+/−100 urad; resolution of motion—0.10 urad RMS; open-loop linearity: 0.2%; material—titanium alloy; approximate load size—40 mm×60 mm×0.8 mm; approximate stage size—36 mm×40 mm×18 mm; weight—<75 g; power draw <7 W; resonant frequency with typical load—>1500 Hz; shock, vibration, and temperature resilience—accommodates MIL-STD-810G.

Figure 3C:
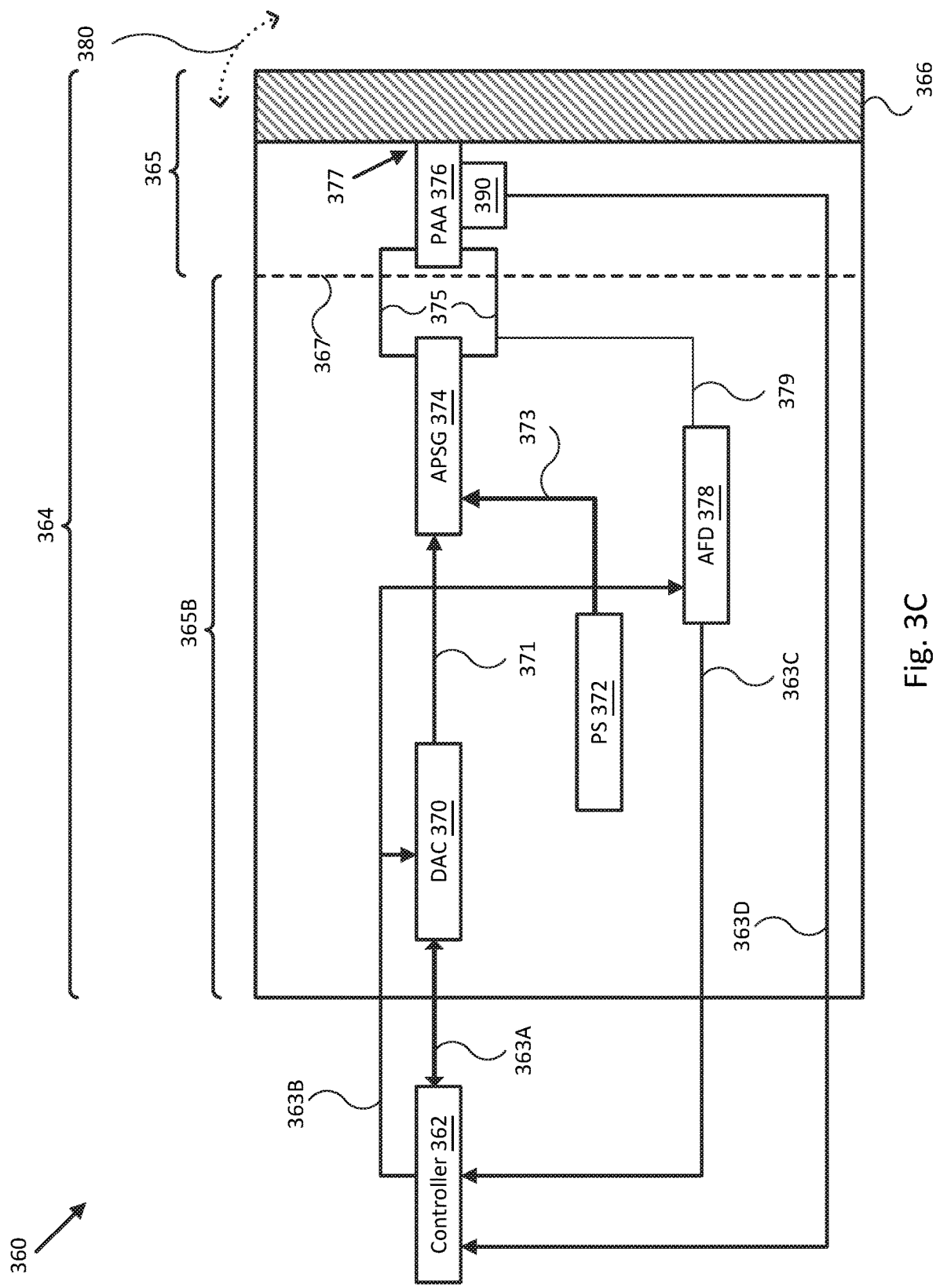
FIG. 3C illustrates a diagram of an open-loop or feed-forward image stabilization system for an imaging system in accordance with an embodiment of the disclosure.

FIG. 3C illustrates a diagram of ISS 360 for imaging system 340 in accordance with an embodiment of the disclosure. As shown in FIG. 3C, ISS 360 includes controller 362 controlling actuator stage 365 of FSMA 364 to tip mirror/load 366 coupled to actuator stage 365 along tip axis 380. Additional components and interconnections used to tilt mirror/load 366 are omitted from FIG. 3C for clarity, but follow a similar electrical and physical arrangement. In various embodiments, FSMA 364 may include actuator stage 365, which may include piezoelectric actuator assembly (PAA) 376 and temperature sensor 390, for example, and actuator interface 365B, which may include digital to analog converter (DAC) 370, power supply (PS) 372, actuator power signal generator (APSG) 374, and, optionally, actuator fault detector (AFD) 378, which may be used to facilitate control of actuator stage 365 of FSMA 364 by controller 362, as described herein. In various embodiments, actuator interface 365B may be implemented on a printed circuit board separate from actuator stage 365, for example, or integrated with and/or mounted to actuator stage 365 generally along demarcation line 367. Tilt components of FSMA 364 not explicitly shown in FIG. 3C may include an additional PAA coupled to mirror/load 366 and powered by additional actuator power signal lines from an additional APSG to actuate tilt of mirror/load 366 along an orthogonal axis relative to tip axis 380.

DAC 370 may be implemented as a relatively high resolution DAC (e.g., a 16 bit DAC) configured to receive digital actuator control signals over communication line 363A (e.g., an SPI bus) and provide corresponding analog actuator control signals to APSG 374 over analog control signal lines 371. APSG 374 may be configured to receive analog actuator control signals from DAC 370 and relatively high voltage power (e.g., power delivered at relative high voltages, such as +/−250V) from PS 372 and to generate and provide actuator power signals to PAA 376 over actuator power lines 375 to drive actuators of PAA 376. PS 372 may be configured to receive relatively low voltage power (e.g., at 50V, provided by platform 110) and generate the relatively high voltage power (e.g., at +/−250V) delivered to APSG over power supply lines 373.

Actuator fault detector 378 may be configured to sense a voltage of power supplied to PAA 376 over actuator power lines 375, through voltage sensor line 379, and to selectively generate and provide a fault detection signal to controller 362 over communication line 363C. Temperature sensor 390 may be configured to measure a temperature of PAA 376 and/or elements of PAA 376 and/or actuator stage 365, for example, and provide such temperature measurements to controller 362 over communication line 363D. More generally, temperature sensor 390 may be coupled within FSMA 364 and be configured to provide a temperature associated with one or more actuators of PAA 376. Chip select line 363B may be used by controller 362 to selectively enable or disable various elements of actuator interface 365B, including DAC 370 and AFD 378 as shown, to reduce power draw or otherwise facilitate operation of ISS 360, as described herein. Communication lines 363A-D may in some embodiments be incorporated into a single communication line, bus, or bundle 363, as shown in FIGS. 3A-B.

In various embodiments, PAA 376 may be implemented by two symmetric piezoelectric actuators to reduce temperature related linear and angular mechanical drift and increase overall system resonant frequency, as described herein. More generally, PAA 376 may be implemented by any type or number of actuators or actuator arrangements coupled to mirror 366 and configured to adjust an orientation (e.g., tip and/or tilt) of mirror 366 relative to a beam of electromagnetic radiation (e.g., projected along optical path 302. APSG 374 may be configured to provide separate power signals to actuators of PAA 376 over actuator power signal lines 375, each within the full voltage range of the power supplied by PS 372 (e.g., +/−250V).

In general operation, controller 362 receives angular motion of imaging system 360 from an angular motion sensor (e.g., angular motion sensor 350) and uses such angular motion to determine a general compensating angular offset equal to and opposite the angular motion of imaging system 360. With some filtering, to both limit any resonances as well as any intended motion from user slew rates, the general compensating angular offset is scaled to the FSMA space based on the gain factors discussed herein. ISS 360 operates as an open-loop or feed-forward network that compensates for any disturbances that are beyond the bandwidth of gimbal system 122, without any closed-loop feedback (e.g., from a separate position sensor).

It is well known that actuator response changes over temperature. The independent response change due to temperature may be measured and then used to generate a calibration curve, which may be applied provide accurate and reliable image stabilization over military-use temperature ranges. Generating a calibration curve to the required accuracy is not trivial. In some embodiments, a calibration method may include placing imaging system 340, including imaging modules 342/343 and associated optical components and ISS 360, within a motion-isolated thermal chamber (e.g., with a controllable ambient temperature) and using imaging system 340 to image a pinhole target. While in such factory calibration setting, the position of the imaged pinhole target on the imaging module sensor array may be measured with substantially sub-pixel accuracy. Imaging system 340 and ISS 360 may be used to measure the relative change in the position of the pinhole target caused by a full range angle offset provided by ISS 360, across a range of temperatures (controlled by the thermal chamber). Using such data, a device-specific calibration curve may be generated (e.g., using interpolation and/or other calibration curve techniques) based on the set of position changes and corresponding temperatures. Such calibration curve may then be applied during operation of ISS 360 to compensate for temperature dependent actuator response changes based a measured temperature of PAA 376 and/or FSMA 364, provided by temperature sensor 390, which can significantly increase system operational accuracy across a broad range of ambient temperatures.

Because ISS 360 uses open-loop or feed-forward control techniques, there is no positional feedback from PAA 376 to controller 362, and detection of failures in the operation of FSMA 364 must be achieved using an alternative approach. In typical operation of PAA 376, delamination of the crystal stack is the primary failure mode. Because the piezoelectric crystals act electrically as well-characterized capacitors, they have a known voltage rise time, when they are operating correctly. If for any reason the rise time is shorter than a specific threshold rise time, it likely means the piezoelectric crystals have become delaminated, and in any case, it means PAA 376 will not operate correctly.

When enabled over chip select line 363B, AFD 378 may be configured to generate a fault detection signal based, at least in part, on electrical responses of at least one actuator of PAA 376 to actuator power signals provided to PAA 376 by APSG 374. More specifically, AFD 378 may be electrically coupled to at least one actuator of PAA 376 (e.g., over voltage sensor line 379) and be configured to sample a rise time of an actuator power signal (e.g., a fault detection signal) delivered to the actuator of PAA 376, using voltage sensor line 379, and compare the sampled rise time to a threshold rise time. Such threshold rise time may be selected to differentiate normal operation of a piezoelectric actuator actuating mirror 366, where the rise time is relatively long, from a state where one or more piezoelectric actuators have delaminated (e.g., separated from actuator stage 365, mirror 366, or from their internal structure), where the rise time is relatively short.

Typically, controller 362 is configured to control APSG 374 to deliver a full range step input actuator power signal (or a known input actuator power signal) as the fault detection signal to an actuator of PAA 376 and activate AFD 378 to sample the corresponding voltage rise time and compare it to a threshold rise time. AFD 378 then generates a fault detection signal if the sampled rise time is less than the threshold rise time, and controller received the fault detection signal over communication line 363C. Upon receiving such fault detection signal, controller 362 may generate a number of different fast steering mirror assembly fault responses, such as disabling DAC 370 and/or portions of DAC 370, disabling PS 372, only providing control signals corresponding to operational (e.g., non-faulty) actuators of PAA 376, generating a fault alarm or notification and delivering it to user interface 132 for presentation to a user and/or delivering such alarm or notification to other elements of system 100, as described herein.

Figure 4:
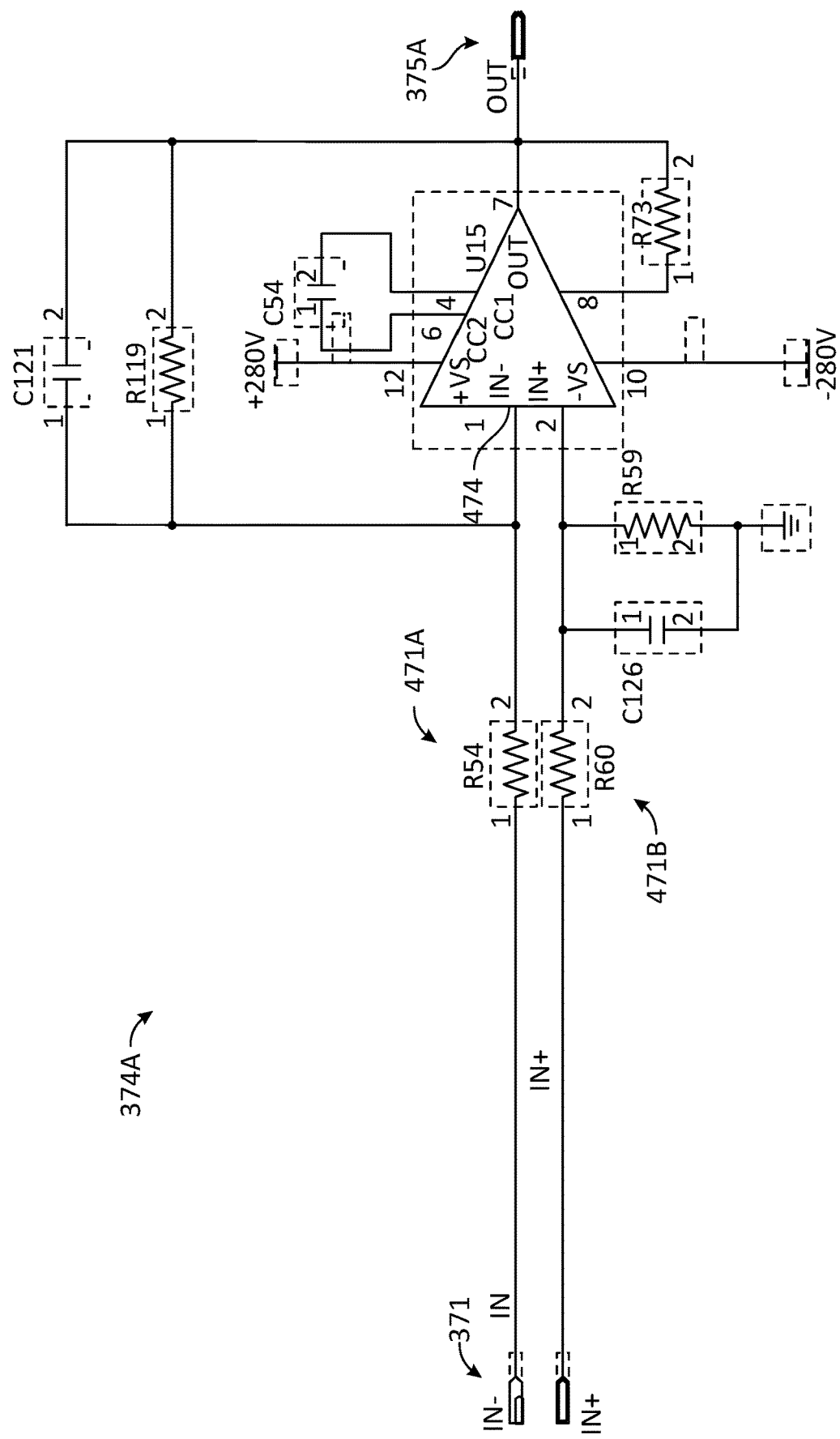
FIG. 4 illustrates a circuit diagram of an actuator power signal generator for an open-loop or feed-forward image stabilization system in accordance with an embodiment of the disclosure.

FIG. 4 illustrates a circuit diagram for a portion/leg 374A of APSG 374 for ISS 360 in accordance With an embodiment of the disclosure. As shown in FIG. 4, APSG 374A receives differential analog actuator control signals across analog control signal lines 371 and then amplifies the analog actuator control signals (e.g., using operational amplifier 474) and provides the resulting single ended actuator power signals over actuator power line 375A. In typical operation, operational amplifier 474 may be supplied with the relatively high voltage power delivered by PS 372 in FIG. 3C (e.g., at pins 10 and 12 as shown) and may be configured to provide an approximate gain of 25. APSG 374A is designed to provide relatively high thermal stability over the temperature ranges typically experienced by ISS 360 and includes two thermally stable input reference resistors 471A and 471B in series between analog control signal lines 371 and respective input pins 1 and 2 of operational amplifier 474. Typically, each leg of APSG 374 includes an embodiment of APSG 374A configured to drive an actuator of PAA 376.

Figure 5:
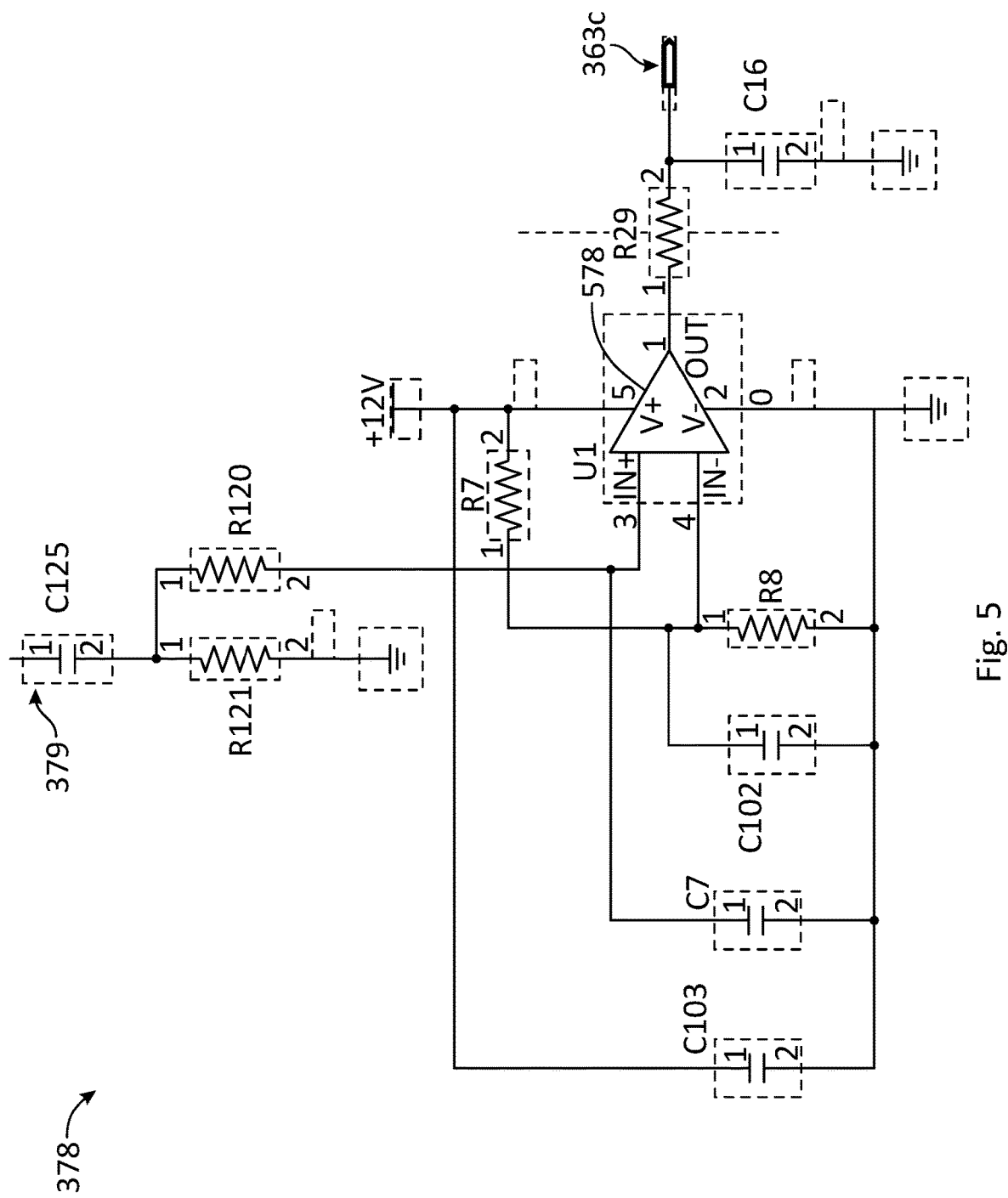
FIG. 5 illustrates a circuit diagram of an actuator fault detector for an open-loop or feed-forward image stabilization system in accordance with an embodiment of the disclosure.

FIG. 5 illustrates a circuit diagram for AFD 378 of ISS 360 in accordance with an embodiment of the disclosure. As shown in FIG. 5, AFD 378 receives a sample of an actuator power signal over voltage sensor line 379, which is then filtered to provide a signal to pin 3 of differential amplifier 578 that is roughly inversely proportional to a rise time of the actuator power signal provided by voltage sensor line 379 (if present). That measured rise time signal is compared to a reference signal at pin 4 of differential amplifier 578 that roughly corresponds to a preselected threshold rise time (e.g., selected by the various circuit elements coupled to pin 4 and the circuit elements coupled to output pin 1). If the measured rise time signal is sufficiently large relative to the threshold rise time signal, differential amplifier 578 outputs a fault detection signal at pin 1 and AFD 378 provides the fault detection signal to controller 362 over communication line 363C, as shown. As described herein, the various circuit elements shown in FIG. 5 may be chosen such that a fault detection signal is only output across communication line 363C when a rise time of an actuator power signal over voltage sensor line 379 is less than a preselected threshold rise time, which has been preselected to differentiate normal operation of PAA 376 from faulty operation of PAA 376 (e.g., typically caused by delamination of one or more actuators within PAA 376).

Figure 6:
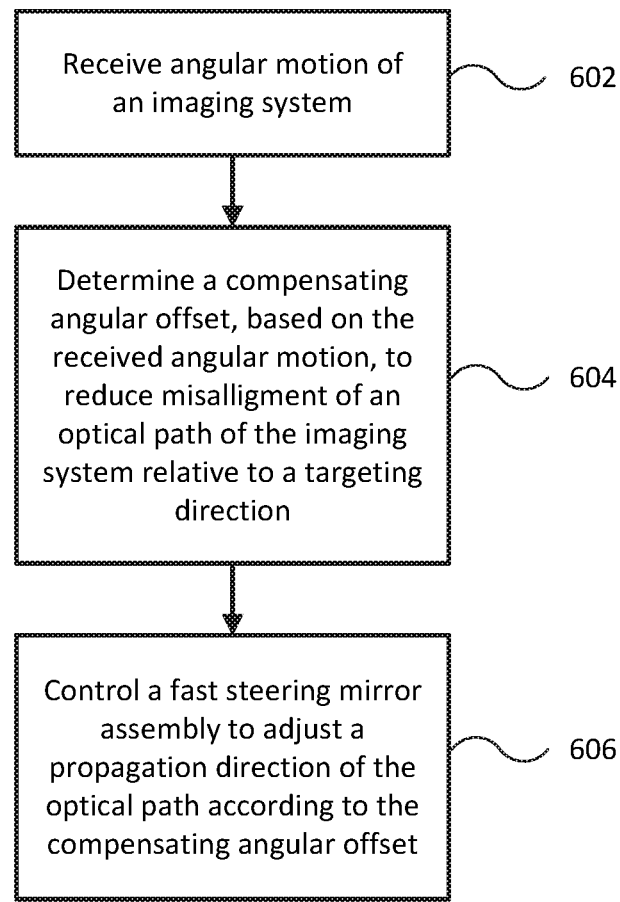
FIG. 6 illustrates a flow diagram of various operations to provide image stabilization for an imaging system using an open-loop or feed-forward image stabilization system in accordance with an embodiment of the disclosure.

FIG. 6 illustrates a flow diagram 600 of various operations to provide image stabilization for imaging system 140 using ISS 160 in accordance with an embodiment of the disclosure. In some embodiments, the operations of FIG. 6 may be implemented as software instructions executed by one or more logic devices associated with corresponding electronic devices, sensors, and/or structures depicted in FIGS. 1-5. More generally, the operations of FIG. 6 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 600 may be performed in an order or arrangement different from the embodiments illustrated by FIG. 6. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 600 is described with reference to systems described in FIGS. 1-5, process 600 may be performed by other systems different from those systems and including a different selection of electronic devices, sensors, assemblies, mechanisms, platforms, and/or platform attributes.

At block 602, an angular motion of an imaging system is received. For example, controller 112 and/or 362 may be configured to receive an angular motion of imaging system 340 from gyroscope/accelerometer (angular motion sensor) 350 coupled to and/or within imaging system 340. In various embodiments, angular motion sensor 350 may be configured to provide the angular motion of imaging system 340, as described herein. In some embodiments, controller 112 and/or 362 may be configured to receive an angular motion of imaging system 340 from gyroscope/accelerometer 116 of platform 110, for example.

At block 604, a compensating angular offset is determined. For example, controller 112 and/or 362 may be configured to determine a compensating angular offset for fast steering mirror assembly 364 based, at least in part, on the angular motion received in block 602, where the compensating angular offset is configured to stabilize imagery projected along an optical path (e.g., adjustable optical path 303) to an imaging module of imaging system 340 (e.g., VS imaging module 342 and/or IR imaging module 343), relative to the angular motion of imaging system 340 received in block 602. In various embodiments, fast steering mirror assembly 364 may be coupled within imaging system 340 (e.g., disposed between imaging module(s) 342 and/or 343 and an aperture/objective optics 310 of imaging system 340) and be configured to adjust a propagation direction of adjustable optical path 303 for imaging system 340, as described herein. In some embodiments, imaging system 340 may include beam splitter 312 configured to split a beam of electromagnetic radiation projected along adjustable optical path 303 into a first beam (e.g., projected along optical path 305) for infrared imaging module 343 and a second beam (e.g., projected along optical path 304) for VS imaging module 342.

In some embodiments, controller 112 and/or 362 may be configured to determine a compensating angular offset by determining an image stabilization component of the received angular motion of the imaging system and determining the compensating angular offset based on the image stabilization component of the received angular motion of the imaging system and one or more angular gains corresponding to a position of fast steering mirror assembly 364 within imaging system 340 relative to at least one rotational axis of imaging system 340, as described herein. For example, controller 112 and/or 362 may be configured to high pass filter received angular motion for imaging system 340 to determine the image stabilization component of the received angular motion, and the angular gains for fast steering mirror assembly 364 may be determined through geometric analysis of a position of FSMA 364 and/or a calibration process similar to that described with respect to process 800 of FIG. 8, but where a known angular motion is applied to imaging system 340 and FSMA 364 is controlled to keep the pixel position of the calibration target stationary as measured using an imaging module of imaging system 340.

At block 606, a fast steering mirror assembly is controlled to adjust a propagation direction of an optical path for an imaging system. For example, controller 112 and/or 362 may be configured to control fast steering mirror assembly 364 to adjust the propagation direction of adjustable optical path 303 for imaging system 340 according to the compensating angular offset determined in block 604. In some embodiments, controller 112 and/or 362 may be configured to receive a temperature of FSMA 364 from temperature sensor 390 coupled within FSMA 364, to determine a temperature compensated digital actuator control signal corresponding to the compensating angular offset and the received temperature based on a calibration curve for FSMA 364, and to provide the temperature compensated digital actuator control signal to FSMA 364 (e.g., to DAC 370 of FSMA 364), as described herein. Accordingly, controller 112 and/or 362 may advantageously be configured to provide open-loop or feed-forward control for fast steering mirror assembly 364 based on angular motion of imaging system 340, as described herein.

Figure 7:
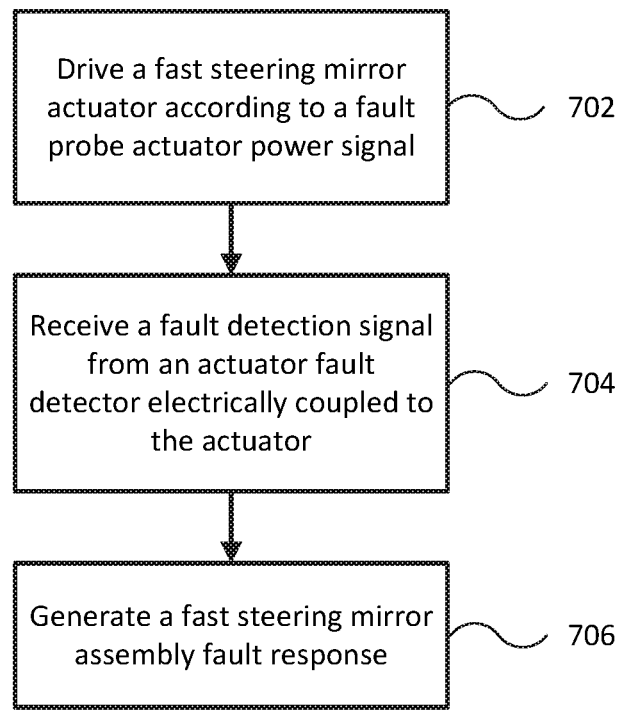
FIG. 7 illustrates a flow diagram of various operations to detect actuator faults in an open-loop or feed-forward image stabilization system for an imaging system in accordance with an embodiment of the disclosure.

FIG. 7 illustrates a flow diagram 700 of various operations to detect actuator faults in ISS 160 for imaging system 140 in accordance with an embodiment of the disclosure. In some embodiments, the operations of FIG. 7 may be implemented as software instructions executed by one or more logic devices associated with corresponding electronic devices, sensors, and/or structures depicted in FIGS. 1-5. More generally, the operations of FIG. 7 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 700 may be performed in an order or arrangement different from the embodiments illustrated by FIG. 7. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 700 is described with reference to systems described in FIGS. 1-5, process 700 may be performed by other systems different from those systems and including a different selection of electronic devices, sensors, assemblies, mechanisms, platforms, and/or platform attributes.

At block 702, a fast steering mirror actuator is driven. For example, controller 112 and/or 362 may be configured to drive piezoelectric actuator assembly 376 according to a fault probe actuator power signal generated by actuator power signal generator 374. In some embodiments, the fault probe actuator power signal is implemented as a full range step input power signal generated by actuator power signal generator 374.

At block 704, a fault detection signal is received. For example, controller 112 and/or 362 may be configured to receive a fault detection signal from actuator fault detector 378 electrically coupled to an actuator of PAA 376 and/or PAA 376 over voltage sensor line 379, where actuator fault detector 378 is configured to generate the fault detection signal based, at least in part, on an electrical response of the actuator of PAA 376 and/or PAA 376 to the fault probe actuator power signal generated in block 702. In some embodiments, actuator fault detector 378 is configured to generate the fault detection signal when a rise time of the electrical response of an actuator of PAA 376 and/or PAA 376 is less than a predetermined threshold rise time, as described herein.

At block 706, a fast steering mirror assembly fault response is generated. For example, controller 112 and/or 362 may be configured to generate a fault indicator comprising an alarm or notification that is provided to a user interface for display to a user and/or to generate a control signal to disable operation of fast steering mirror assembly 364 and/or any elements of FSMA 364, as described herein. Accordingly, controller 112 and/or 362 may advantageously be configured to provide fault detection for fast steering mirror assembly 364 without disrupting the open-loop or feed-forward control provided for fast steering mirror assembly 364, as described herein.

Figure 8:
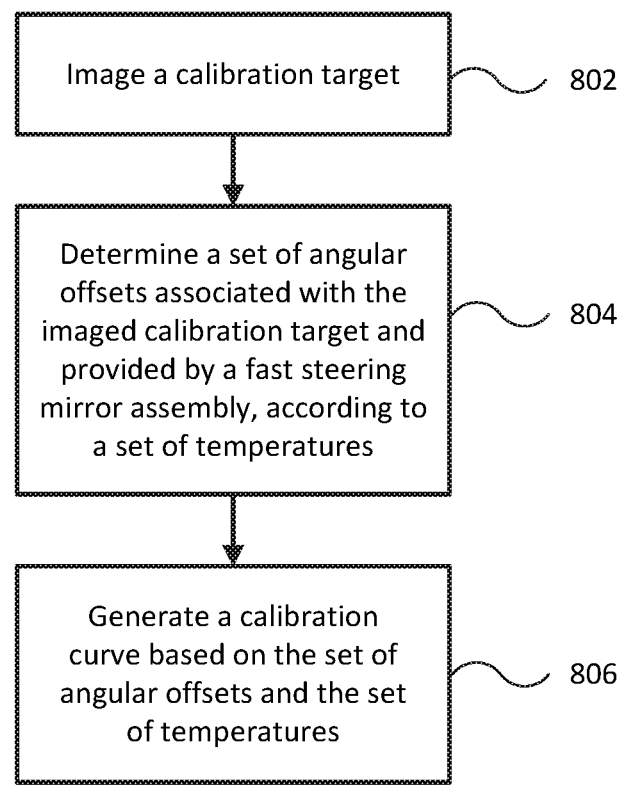
FIG. 8 illustrates a flow diagram of various operations to calibrate an open-loop or feed-forward image stabilization system for an imaging system in accordance with an embodiment of the disclosure.

FIG. 8 illustrates a flow diagram 800 of various operations to calibrate ISS 160 for imaging system 140 in accordance with an embodiment of the disclosure. In some embodiments, the operations of FIG. 8 may be implemented as software instructions executed by one or more logic devices associated with corresponding electronic devices, sensors, and/or structures depicted in FIGS. 1-5. More generally, the operations of FIG. 8 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 800 may be performed in an order or arrangement different from the embodiments illustrated by FIG. 8. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 800 is described with reference to systems described in FIGS. 1-6, process 800 may be performed by other systems different from those systems and including a different selection of electronic devices, sensors, assemblies, mechanisms, platforms, and/or platform attributes.

At block 802, a calibration target is imaged. For example, controller 112 and/or 362 may be configured to image a calibration target using VL imaging module 342 and/or IR imaging module 343 of imaging system 340.

At block 804, a set of angular offsets of an imaged calibration target is determined. For example, controller 112 and/or 362 may be configured to determine a set of angular offsets associated with a calibration target imaged in block 804, where the set of angular offsets are provided by FSMA 364. In various embodiments, the set of angular offsets may be determined according to a predetermined set of temperatures, selected to cover the range of temperatures in which imaging system 340 is expected to operate, which may be applied to imaging system 340 by placing it within a temperature chamber, as described herein. For example, controller 112 and/or 362 may be configured to determine that a current temperature of imaging system 340 approximates one of the predetermined set of temperatures, to determine a first pixel position associated with the calibration target on an imaging module (e.g., VL imaging module 342 and/or IR imaging 343) of imaging system 340, to control FSMA 364 to adjust the propagation direction of adjustable optical path 303 for imaging system 340 according to one or more calibration actuator control signals (e.g., provided by controller 112 and/or 362, and/or DAC 370), and to determine the set of angular offsets based on a difference between the first pixel position and one or more additional pixel positions corresponding to the one or more calibration actuator control signals.

In various embodiments, the calibration target may be implemented by a pinhole target and the first and additional pixel positions of the pinhole target correspond to a center or edge of the imaged pinhole target. In some embodiments, the first and additional pixel positions of such calibration target include sub-pixel positions based, at least in part, on a shape of the calibration target and/or a focal plane array arrangement of the imaging module (e.g., VL imaging module 342 and/or IR imaging 343) of imaging system 340.

At block 806, a calibration curve is generated. For example, controller 112 and/or 362 may be configured to generate a calibration curve based on the predetermined set of temperatures identified in block 804 and the set of angular offsets determined in block 804. In various embodiments, such calibration curve may be implemented as a lookup table of actuator control signals referenced by angular offset and temperature, such that a temperature compensated actuator control signal may be determined from a desired angular offset and a known temperature, using various calibration curve techniques, including interpolation between calibration points within such lookup table, as described herein.

By providing such systems and techniques for open-loop or feed-forward image stabilization, embodiments of the present disclosure substantially reduce the complexity and cost to implement image stabilization while reducing or eliminating imager jitter and defocusing effects caused by motion of the imaging system. Moreover such systems and techniques may be used to increase the performance/speed of image stabilization above that achievable by conventional systems. As such, embodiments provide imaging and targeting systems with significantly increased range performance.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system comprising:
   a fast steering mirror assembly coupled within an imaging system and configured to adjust a propagation direction of an optical path for the imaging system; and
   a logic device configured to control the fast steering mirror assembly based on angular motion of the imaging system, wherein the logic device is configured to:
      receive the angular motion of the imaging system from an angular motion sensor coupled to the imaging system, wherein the received angular motion of the imaging system produces an angular offset in the propagation direction of the optical path;
      determine a compensating angular offset for the fast steering mirror assembly based, at least in part, on the received angular motion of the imaging system, wherein the compensating angular offset is configured to stabilize imagery projected along the optical path to an imaging module of the imaging system, by at least partially counteracting the angular offset produced by the angular motion of the imaging system; and
      control the fast steering mirror assembly to adjust the propagation direction of the optical path for the imaging system according to the determined compensating angular offset;
   wherein the fast steering mirror assembly comprises:
   a mirror configured to reflect a beam of electromagnetic radiation projected along the optical path; and
   an actuator assembly comprising one or more actuators coupled to the mirror and configured to adjust a position of the mirror;
   wherein the controlling the fast steering mirror assembly to adjust the propagation direction of the optical path comprises controlling the one or more actuators to adjust the position of the mirror based, at least in part, on the determined compensating angular offset, without positional feedback from the actuator assembly.

2. The system of claim 1, further comprising:
   the angular motion sensor coupled to the imaging system, wherein the angular motion sensor is configured to provide the angular motion of the imaging system; and
   the imaging module of the imaging system, wherein the imaging module comprises a visible spectrum imaging module or an infrared imaging module, and wherein the fast steering mirror assembly is disposed between the imaging module and an aperture of the imaging system.

3. The system of claim 1, wherein the imaging module comprises an infrared imaging module sensitive to a first electromagnetic spectrum, the system further comprising:
   a second imaging module sensitive to a second electromagnetic spectrum different from the first electromagnetic spectrum; and
   a beam splitter configured to split the beam of electromagnetic radiation projected along the optical path into a first beam for the infrared imaging module and a second beam for the second imaging module.

4. The system of claim 1, wherein the determining the compensating angular offset for the fast steering mirror assembly comprises:
   determining an image stabilization component of the received angular motion of the imaging system; and
   determining the compensating angular offset for the fast steering mirror assembly based, at least in part, on the image stabilization component of the received angular motion of the imaging system and one or more angular gains corresponding to a position of the fast steering mirror assembly within the imaging system relative to at least one rotational axis of the imaging system.

5. The system of claim 1, wherein the logic device is configured to:
   control the fast steering mirror assembly to drive an actuator of the fast steering mirror assembly according to a fault probe actuator power signal;
   receive a fault detection signal from an actuator fault detector electrically coupled to the actuator, wherein the actuator fault detector is configured to generate the fault detection signal based, at least in part, on an electrical response of the actuator to the fault probe actuator power signal; and
   generate a fast steering mirror assembly fault response.

6. The system of claim 5, wherein:
   the fault probe actuator power signal comprises a full range step input actuator power signal; and
   the actuator fault detector is configured to generate the fault detection signal when a rise time of the electrical response of the actuator is less than a predetermined threshold rise time.

7. The system of claim 5, wherein the fast steering mirror assembly fault response comprises:
   a fault indicator comprising an alarm or notification that is provided to a user interface for display to a user; and/or
   a control signal to disable operation of the fast steering mirror assembly.

8. A system comprising:
   a fast steering mirror assembly coupled within an imaging system and configured to adjust a propagation direction of an optical path for the imaging system; and
   a logic device configured to control the fast steering mirror assembly based on angular motion of the imaging system, wherein the logic device is configured to:
      receive the angular motion of the imaging system from an angular motion sensor coupled to the imaging system;
      determine a compensating angular offset for the fast steering mirror assembly based, at least in part, on the received angular motion of the imaging system, wherein the compensating angular offset is configured to stabilize imagery projected along the optical path to an imaging module of the imaging system, relative to the angular motion of the imaging system; and
      control the fast steering mirror assembly to adjust the propagation direction of the optical path for the imaging system according to the determined compensating angular offset;
   wherein the controlling the fast steering mirror assembly comprises:
      receiving a temperature of the fast steering mirror assembly from a temperature sensor coupled within the fast steering mirror assembly;
      determining a temperature compensated digital actuator control signal corresponding to the compensating angular offset and the received temperature and based on a calibration curve for the fast steering mirror assembly; and
      providing the temperature compensated digital actuator control signal to the fast steering mirror assembly.

9. The system of claim 1, wherein:
the one or more actuators are coupled to the mirror and configured to adjust a tip and/or tilt of the mirror relative to the beam of electromagnetic radiation; and
the fast steering mirror assembly comprises:
an actuator power signal generator configured to generate and provide actuator power signals to the one or more actuators to drive the one or more actuators to adjust the tip and/or tilt of the mirror;
a temperature sensor coupled within the fast steering mirror assembly and configured to provide a temperature associated with the one or more actuators; and
an actuator fault detector electrically coupled to at least one of the one or more actuators and configured to generate a fault detection signal based, at least in part, on electrical responses of the at least one actuator to the actuator power signals.

10. A system comprising:
a fast steering mirror assembly coupled within an imaging system and configured to adjust a propagation direction of an optical path for the imaging system; and
a logic device configured to control the fast steering mirror assembly based on angular motion of the imaging system, wherein the logic device is configured to:
receive the angular motion of the imaging system from an angular motion sensor coupled to the imaging system;
determine a compensating angular offset for the fast steering mirror assembly based, at least in part, on the received angular motion of the imaging system, wherein the compensating angular offset is configured to stabilize imagery projected along the optical path to an imaging module of the imaging system, relative to the angular motion of the imaging system; and
control the fast steering mirror assembly to adjust the propagation direction of the optical path for the imaging system according to the determined compensating angular offset;
wherein the logic device is configured to:
control the imaging module of the imaging system to image a calibration target;
determine a set of angular offsets associated with the imaged calibration target and provided by the fast steering mirror assembly, according to a predetermined set of temperatures of the imaging system; and
generate a calibration curve based, at least in part, on the set of angular offsets and the predetermined set of temperatures.

11. The system of claim 10, wherein the determining the set of angular offsets comprises:
determining that a current temperature of the imaging system approximates one of the predetermined set of temperatures;
determining a first pixel position associated with the calibration target on the imaging module of the imaging system;
controlling the fast steering mirror assembly to adjust the propagation direction of the optical path for the imaging system according to one or more calibration actuator control signals; and
determining the set of angular offsets based on a difference between the first pixel position and one or more additional pixel positions corresponding to the one or more calibration actuator control signals.

12. The system of claim 10, wherein:
the calibration target comprises a pinhole target and the first and additional pixel positions of the pinhole target correspond to a center or edge of the imaged pinhole target; and
the first and additional pixel positions of the pinhole target comprise sub-pixel positions based, at least in part, on a shape of the pinhole target and/or a focal plane array arrangement of the imager of the imaging system.

13. A method comprising:
receiving an angular motion of an imaging system from an angular motion sensor coupled to the imaging system, wherein the received angular motion of the imaging system produces an angular offset in a propagation direction of an optical path of the imaging system;
determining an angular offset for a fast steering mirror assembly coupled within the imaging system based, at least in part, on the received angular motion of the imaging system, wherein the fast steering mirror assembly is configured to adjust the propagation direction of the optical path for the imaging system, and wherein the compensating angular offset is configured to stabilize imagery projected along the optical path to an imaging module of the imaging system, by at least partially counteracting the angular offset produced by the angular motion of the imaging system; and
controlling the fast steering mirror assembly, based on the angular motion of the imaging system, to adjust the propagation direction of the optical path for the imaging system according to the determined compensating angular offset;
wherein the fast steering mirror assembly comprises:
a mirror configured to reflect a beam of electromagnetic radiation projected along the optical path; and
an actuator assembly comprising one or more actuators coupled to the mirror and configured to adjust a position of the mirror;
wherein the controlling the fast steering mirror assembly to adjust the propagation direction of the optical path comprises controlling the one or more actuators to adjust the position of the mirror based, at least in part, on the determined compensating angular offset, without positional feedback from the actuator assembly.

14. The method of claim 13, wherein:
the angular motion sensor is configured to provide the angular motion of the imaging system;
the imaging module comprises a visible spectrum imaging module or an infrared imaging module; and
the fast steering mirror assembly is disposed between the imaging module and an aperture of the imaging system.

15. The method of claim 13, wherein:
the imaging module comprises an infrared imaging module sensitive to a first electromagnetic spectrum;
the imaging system comprises a second imaging module sensitive to a second electromagnetic spectrum different from the first electromagnetic spectrum; and
the imaging system comprises a beam splitter configured to split the beam of electromagnetic radiation projected along the optical path into a first beam for the infrared imaging module and a second beam for the second imaging module.

16. The method of claim 13, wherein the determining the compensating angular offset for the fast steering mirror assembly comprises:
determining an image stabilization component of the received angular motion of the imaging system; and determining the compensating angular offset for the fast steering mirror assembly based, at least in part, on the image stabilization component of the received angular motion of the imaging system and one or more angular gains corresponding to a position of the fast steering mirror assembly within the imaging system relative to at least one rotational axis of the imaging system.

17. The method of claim 13, wherein the controlling the fast steering mirror assembly comprises:

receiving a temperature of the fast steering mirror assembly from a temperature sensor coupled within the fast steering mirror assembly;

determining a temperature compensated digital actuator control signal corresponding to the compensating angular offset and the received temperature and based on a calibration curve for the fast steering mirror assembly; and providing the temperature compensated digital actuator control signal to the fast steering mirror assembly.

18. The method of claim 13, wherein:

the one or more actuators coupled to the mirror are configured to adjust a tip and/or tilt of the mirror relative to the beam of electromagnetic radiation; and the fast steering mirror assembly comprises:

an actuator power signal generator configured to generate and provide actuator power signals to the one or more actuators to drive the one or more actuators to adjust the tip and/or tilt of the mirror;

a temperature sensor coupled within the fast steering mirror assembly and configured to provide a temperature associated with the one or more actuators; and an actuator fault detector electrically coupled to at least one of the one or more actuators and configured to generate a fault detection signal based, at least in part, on electrical responses of the at least one actuator to the actuator power signals.

19. The method of claim 13, further comprising:

controlling the fast steering mirror assembly to drive an actuator of the fast steering mirror assembly according to a fault probe actuator power signal;

receiving a fault detection signal from an actuator fault detector electrically coupled to the actuator, wherein the actuator fault detector is configured to generate the fault detection signal based, at least in part, on an electrical response of the actuator to the fault probe actuator power signal; and generating a fast steering mirror assembly fault response.

20. The method of claim 13, further comprising:

controlling the imaging module of the imaging system to image a calibration target;

determining a set of angular offsets associated with the imaged calibration target and provided by the fast steering mirror assembly, according to a predetermined set of temperatures of the imaging system; and generating a calibration curve based, at least in part, on the set of angular offsets and the predetermined set of temperatures.

\* \* \* \* \*